United States Patent
Akkapeddi (10) Patent No.: US 12,299,091 B2
(45) Date of Patent: May 13, 2025

(54) SYSTEM AND METHOD FOR SWITCHING BETWEEN PUBLIC AND PRIVATE OPERATIONS FOR CONDUCTING INTERACTIONS IN A METAVERSE

(71) Applicant: Bank of America Corporation, Charlotte, NC (US)

(72) Inventor: Naga Vamsi Krishna Akkapeddi, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 371 days.

(21) Appl. No.: 17/936,656

(22) Filed: Sep. 29, 2022

(65) Prior Publication Data

US 2024/0111847 A1   Apr. 4, 2024

(51) Int. Cl.
    *G06F 21/31*    (2013.01)

(52) U.S. Cl.
    CPC .................................... *G06F 21/31* (2013.01)

(58) Field of Classification Search
    CPC ....... G06F 21/31; H04L 67/01; H04L 67/131; H04L 9/40; H04L 41/28; A63F 13/40; A63F 13/73; A63F 13/79
    See application file for complete search history.

(56) References Cited

U.S. PATENT DOCUMENTS

| | | | |
|---|---|---|---|
| 8,826,451 B2 | 9/2014 | Blubaugh | |
| 8,869,265 B2 | 10/2014 | Dang et al. | |
| 9,094,388 B2 | 7/2015 | Tkachev | |
| 9,280,377 B2 | 3/2016 | Lang et al. | |
| 9,537,899 B2 | 1/2017 | Cox et al. | |
| 9,542,010 B2 | 1/2017 | Roberts et al. | |
| 9,569,625 B2 | 2/2017 | Dibona et al. | |
| 9,819,680 B2 | 11/2017 | Grigg et al. | |
| 10,015,156 B2 | 7/2018 | Jones-Mcfadden et al. | |
| 10,078,755 B2 | 9/2018 | Hayashida | |
| 10,320,623 B2 | 6/2019 | Kolluru et al. | |
| 10,356,215 B1* | 7/2019 | Cronin | G06F 3/04815 |
| 10,496,808 B2 | 12/2019 | Van Os et al. | |
| 10,642,991 B2* | 5/2020 | Clement | G07F 17/3211 |
| 10,965,547 B1 | 3/2021 | Esposito et al. | |

(Continued)

FOREIGN PATENT DOCUMENTS

EP    2947569 A1    11/2015

*Primary Examiner* — Eric W Shepperd (57) ABSTRACT

A system for switching between public and private operations for conducting interactions comprises a processor associated with a server. The processor accesses a virtual environment configured to provide interactions associated with an entity. The processor receives interaction objects and an input operation mode from an avatar associated with a user device for an interaction. The processor determines the input operation mode is a private operation mode and further processes the interaction objects and the user profile to determine a first set of protocols compatible with the private operation mode. The processor verifies that the interaction objects match authentication requirements of the first set of the protocols. The processor determines a system environment is compatible with the first set of the protocols and comprises a set of applications in the private operation mode. The processor executes the applications to process the interaction objects to conduct the first interaction.

20 Claims, 3 Drawing Sheets

(56) References Cited

U.S. PATENT DOCUMENTS

| | | | |
|---|---|---|---|
| 11,032,360 B2 | 6/2021 | Hosie et al. | |
| 11,044,154 B2 | 6/2021 | Hockett et al. | |
| 11,165,831 B2 | 11/2021 | Higgins et al. | |
| 2009/0150418 A1* | 6/2009 | Shuster | A63F 13/79 |
| 2011/0055728 A1* | 3/2011 | Dawson | G06F 3/04815 |
| | | | 715/753 |
| 2012/0025976 A1* | 2/2012 | Richey | H04W 4/023 |
| | | | 340/539.13 |
| 2017/0316186 A1* | 11/2017 | Breitenfeld | G06F 21/6218 |
| 2020/0073681 A1* | 3/2020 | Carroll | G06F 9/451 |
| 2020/0298126 A1* | 9/2020 | Kornmann | G07F 17/3286 |
| 2021/0218797 A1* | 7/2021 | Lang | H04L 63/105 |
| 2022/0269333 A1* | 8/2022 | Dedonato | G04G 21/025 |
| 2023/0164223 A1* | 5/2023 | Lee | H04L 67/131 |
| | | | 709/204 |

* cited by examiner

SYSTEM AND METHOD FOR SWITCHING BETWEEN PUBLIC AND PRIVATE OPERATIONS FOR CONDUCTING INTERACTIONS IN A METAVERSE

TECHNICAL FIELD

The present disclosure relates generally to network communications and information security, and more specifically to a system and method for switching between public and private operations for conducting interactions with compatible protocols and applications within a metaverse.

BACKGROUND

Interactions may be performed between a user device and an entity using multiple applications in different system environments in a metaverse. It is challenging to choose a system environment with applications compatible with operation protocols and interaction data due to lack of operation control between different system environments.

SUMMARY

Conventional technology is not configured to allow user devices to switch between public and private operations to conduct interactions with different protocols through corresponding systems in a virtual environment (e.g., such as a metaverse). The system described in the present disclosure is particularly integrated into a practical application of allowing a user to use a user device (e.g., augmented reality (AR)/virtual reality (VR) headset) to switch between a public operation mode and a private operation mode to conduct interactions in the virtual environment.

The disclosed system is configured to switch between public and private operation modes with compatible protocols and applications to conduct an interaction between a user device with an entity in a virtual environment. The disclosed system is configured to determine a set of layers of protocols compatible with an operation mode for the interaction. For example, a user may select a private operation mode or a public operation mode through a user device to interact with an entity in the virtual environment. A private operation mode may require a higher level of authentication and security requirements than a public operation mode for conducting a particular interaction. Based on a request with interaction objects and an input private operation mode received from a user device in the virtual environment, the disclosed system may be configured to determine a first set of protocols for private operations. If the interaction objects match authentication requirements of the first set of the protocols, the disclosed system may determine a compatible system with a first set of applications which are configured to process the interaction objects. In one embodiment, the compatible system may be a cloud computing environment with the first set of the applications which support the first set of the protocols to conduct the interaction in the private operation mode. If the interaction objects do not match the authentication requirements of the first set of the protocols for the private operation mode, the disclosed system may reverse the private operation mode to a public operation mode. The disclosed system may determine a second set of protocols compatible with the public operation mode and a corresponding system with a second set of applications. The corresponding system may be an on-premise computing environment with the second set of applications which support the second set of protocols to conduct the interaction in the public operation mode.

In one embodiment, the system for switching between public and private operations for conducting interactions in a virtual environment comprises a processor and a memory. The memory is operable to store a user profile with authentication information and a plurality of layers of protocols. The authentication information is configured to authorize a user device associated with a user to access the virtual environment to perform corresponding interactions with an entity associated with different system environments. Each layer of protocols comprises a set of protocols. Each protocol is configured to provide a corresponding level of interaction security to facilitate completing the interaction in a private operation mode or a public operation mode. The processor accesses a virtual environment comprising a plurality of virtual operation areas. Each virtual operation area is configured to provide a corresponding interaction associated with the entity. In some embodiments, the processor receives a request with a plurality of interaction objects and an input operation mode from an avatar associated with a user device for a first interaction in a particular virtual operation area. The processor determines whether the input operation mode is a private operation mode. In response to determining that the input operation mode is the private operation mode, the processor processes the plurality of the interaction objects and the user profile to determine a first set of protocols compatible with the private operation mode. The first set of protocols are from the plurality layers of the protocols. The processor verifies whether the plurality of the interaction objects match authentication requirements of the first set of the protocols. In response to determining that the plurality of the interaction objects match the authentication requirements of the first set of the protocols, the processor determines a first system environment which is compatible with the first set of the protocols and comprises a first set of applications configured to perform the first interaction in the private operation mode. The processor executes the first set of the applications to process the interaction objects to conduct the first interaction in the virtual operation area. In response to determining that the plurality of the interaction objects do not match the authentication requirements of the first set of the protocols corresponding to the private operation mode, the processor reverses the private operation mode to a public operation mode through the user device. The processor processes the plurality of the interaction objects to determine a second set of protocols compatible with a public operation mode. The second set of the protocols are from the plurality layers of the protocols. The processor determines a system environment compatible with the second set of the protocols. The system environment comprises a second set of applications to perform the first interaction in the public operation mode. The processor executes the second set of the applications to process the interaction objects to conduct the first interaction in the virtual operation area.

The present disclosure presents a practical application that may be implemented by the processor of the server to process interaction objects from a user device and an associated user profile to determine whether and how to switch between public and private operation modes to conduct interactions with suitable protocols in a compatible system environment. For example, a user may choose a private operation mode using an AR/YR headset for an interaction in the virtual environment. Based on authentication requirements of the protocols for the private operation mode, interaction objects and the user profile, the disclosed system determines whether to operate in the private operation mode or reverse the private operation mode to a public operation mode through the user device. In this way, a particular interaction between the avatar and entity may be performed in a suitable system environment with compatible applications that support interaction protocols in real time. This process conserves processing resources because the user device may avoid going through different applications in different system environments which may require different authentications and security verifications.

The disclosed system leads to a technical advantage of improving information security for conducting interactions under public and private operations. The disclosed system helps ensure a secure and compatible computing environment with applications supporting the corresponding layers of protocols based on user interaction objects and authentication information of the user profile. Thus, the disclosed system improves computer system security and interaction operation efficiency of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to switch between public and private operations to conduct an interaction in a virtual environment. This disclosure presents a system in which system operation modes may be switched between public and private operations for performing interactions with compatible protocols through a compatible system in a virtual environment by referring to FIGS. 1-3.

System Overview

Figure 1:
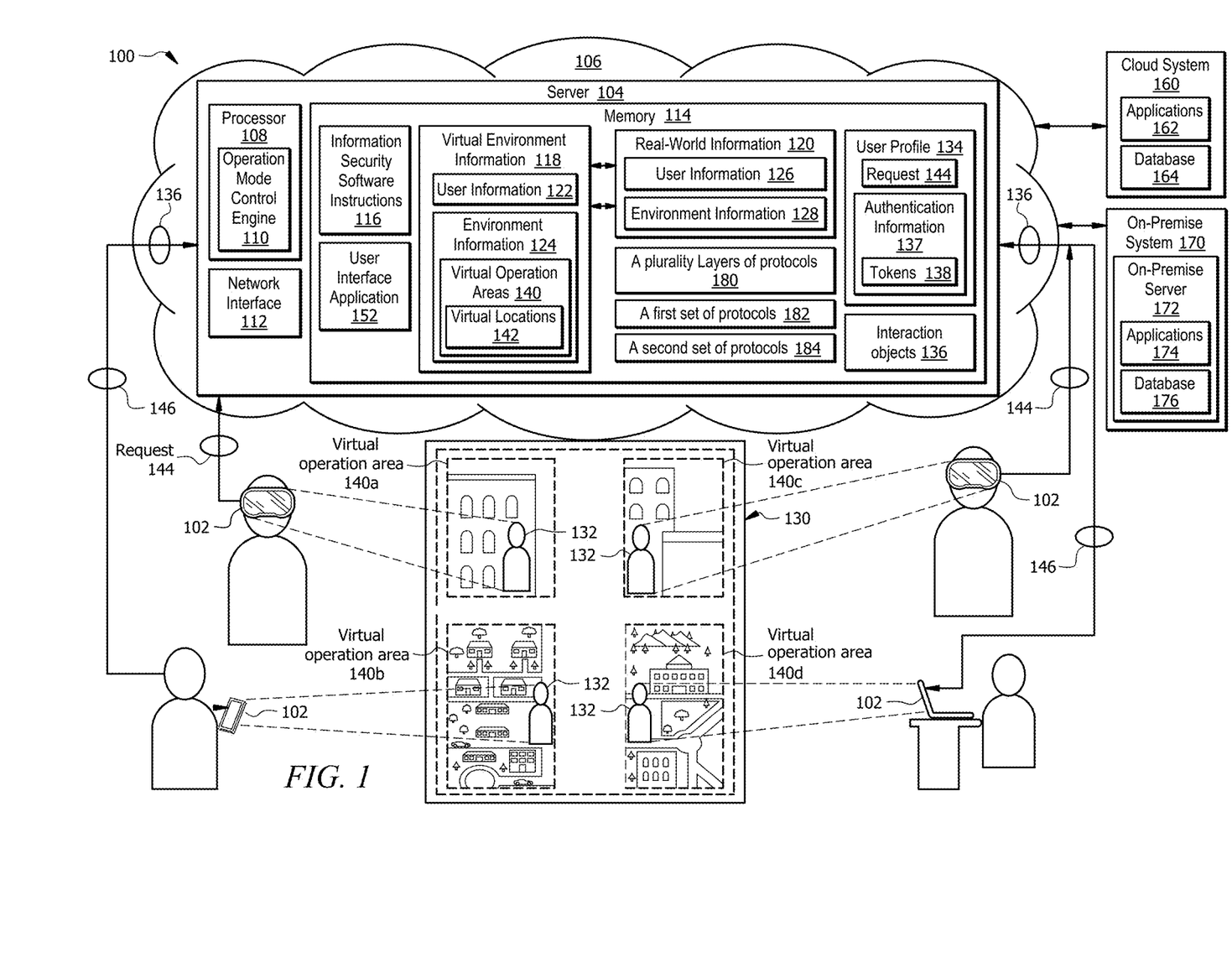
FIG. 1 illustrates an embodiment of a system configured to switch between public and private operations in a virtual environment.

FIG. 1 illustrates one embodiment of a system 100 that is configured to switch between public and private operations to perform interactions within a virtual environment 130. In one embodiment, system 100 comprises a server 104, one or more user devices 102, a cloud system 160, an on-premise system 170 and a network 106. The system 100 may be communicatively coupled to the network 106 and may be operable to transmit data between each user device 102, the server 104, the cloud system 160 or on-premise system 170 through the network 106. Network 106 enables the communications between components of the system 100. A cloud system 160 is a cloud computing environment (e.g., a cloud system environment) that includes a plurality of applications 162 and a database 164. Each application 162 may be executed in a private operation mode or a public operation mode to facilitate completing an interaction between an avatar 132 of a user device 102 and an entity. The database 164 may include user interaction data associated with completed interactions implemented by the applications 162. An on-premise system 170 is an on-premise computing system (e.g., an on-premise system environment) that may be operated by an organizational entity and include an on-premise server 172 and a database 176. The on-premise server 172 may include a plurality of applications 174. The applications 174 may be executed in a private operation mode or a public operation mode to facilitate completing an interaction between an avatar 132 associated with a user device 102 and an entity in the virtual environment 130. The database 176 may include user interaction data associated with completed interactions implemented by the applications 174 executed by the on-premise server 172. A cloud system 160 may be compatible with more secure communication protocols which provide more security communications to implement the interactions.

In some embodiments, the system 100 may be implemented by the server 104 to switch between public and private operations corresponding to authentication requirements of communication protocols based on interaction objects 136, a user input operation mode and a user profile 134. For example, the server 104 may receive interaction objects 136 and a user selected private operation mode for an interaction in a particular virtual operation area 140 in the virtual environment 130. If the interaction objects 136 match the authentication requirements of a first set of the protocols 182 for private operations. The server 104 may determine a system environment with a first set of applications supporting the first set of the protocols 182 to conduct the interaction in the private operation mode. Otherwise, the server 104 may reverse the private operation mode to a public operation mode through the user device 102. The server 104 may determine a second set of protocols 184 and a system environment with a second set of applications supporting the second set of protocols 184 to conduct the interaction in the public operation mode.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow a user to send an interaction request or request 144 for the user device 102 to access and navigate through virtual operation areas 140 in the virtual environment 130 to interact with an entity through the server 104.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 and the user within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
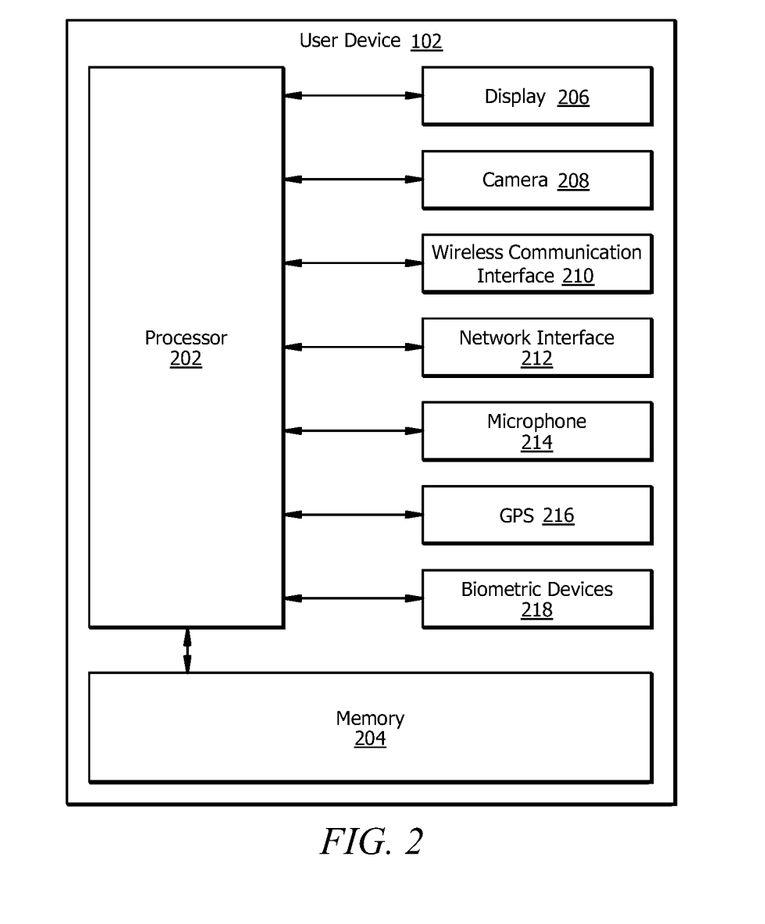
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Wireless communication interface 210 is configured to employ any suitable communication protocol.

The network interface 212 may be configured to use any suitable type of communication protocol and enable wired and/or wireless communications. as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric device 218 is communicably coupled to processor 202. Biometric devices 218 are configured to capture information about a person's physical characteristics and to output a biometric signal based on captured information.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the operation mode control engine 110, as described further below in conjunction with the operational flows of the method 300 described in FIG. 3. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture.

The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the operation mode control engine 110 is implemented using logic units, FPGAs, ASICs, DSPs, or any other suitable hardware. The operation mode control engine 110 is configured to operate as described in FIG. 3. The operation mode control engine 110 may be configured to perform the operations of the method 300 as described in FIG. 3. For example, the operation mode control engine 110 may be configured to provide multifactor authentication within a real-world environment and a virtual environment 130 for a user to access and interact with the entity in the virtual environment 130. As another example, the operation mode control engine 110 may be configured to facilitate real-world resource and/or virtual resource transfers between users within a virtual environment 130.

The memory 114 stores any of the information described above with respect to FIGS. 1-3 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, a user interface application 152, user profile 134, a plurality layers of protocols 180, a first set of protocols 182, a second set of protocols 184, virtual environment information 118, real-world information 120, and/or any other data or instructions. The information security software instructions 116 may comprise any suitable set of instructions, logic, rules, or code operable to execute the operation mode control engine 110. In an example operation, the memory may store a user interface application 152, and other program models which executed by the processor 108 to implement operational flows of the system of FIG. 1.

A user profile 134 may include an interaction request 144, authentication information 137, and interaction objects 136. The interaction objects 136 may include user input data received from the user device 102 and other communication data for an interaction through a user interface application 152 executed on the user device 102.

A user profile 134 further includes one or more of user identifiers, username, physical address, email address, phone number, and any other data, such as documents, files, media items, etc. A plurality of user profiles may be stored by the processor 108 in the memory 114. The authentication information 137 may include user credentials for provide authentication for an avatar 132 associated with the user device 102 to access the virtual operation areas 140 in a virtual environment 130. The authentication information may include authentication tokens 138, biometric credentials, answers to secret questions for accessing the virtual environment 130 and different applications of corresponding systems. The authentication tokens 138 may include non-fungible tokens (NFT). The authentication tokens 138 may be configured to register a user and a user device 102 with an entity associated with virtual operation areas 140 and different system environments in the system 100. For example, each authentication token 138 may represent an access key or access credential to provide authentication and security verification for the avatar 132 to access the virtual operation areas 140 and a particular system environment to interact with the corresponding applications.

The virtual environment information 118 comprises user information 122 and environment information 124. The user information 122 generally comprises information that is associated with any user profiles associated with user accounts that can be used within a virtual environment 130. The environment information 124 includes data of virtual operation areas 140a-140d and corresponding virtual locations 142. For example, user information 122 may comprise user profile information, online account information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars 132, virtual operation areas 140, or any other suitable type of element that is present within a virtual environment 130. In some embodiments, the environment information 124 may be used to create a representation of a virtual environment 130 for users. In this case, a virtual environment 130 may be implemented using any suitable type of software framework or engine. Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The server 104 may generate a virtual environment 130 based on the virtual environment information 118 and the real-world information 120. FIG. 1 illustrates an example of a virtual environment 130. In some embodiments, the virtual environment 130 comprises a plurality of associated virtual meeting areas 140 (e.g., 140a-140d). Each virtual meeting area 140 may be configured to provide certain types interactions associated with an entity, corresponding physical locations and interactions in a real-world environment. In one embodiment, the virtual meeting areas 140 may be configured and executed by the processor 108 to provide one or more application services and interactions provided by an entity at different physical locations in the real-world environment.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real-world environment 120 and the virtual environment 130, and vice-versa.

Within the virtual environment 130, an avatar 132 is generated by the processor 108 as a graphical representation of a user device 102 within the virtual environment 130. The avatar 132 includes a plurality of features and characteristics which are processed by the processor 108 to present the avatar 132 as the graphical representation of a user device 102 in the virtual environment 130. For example, the server 104 may receive a signal indicating a physical location of the user device 102 and/or detect the user device 102 in the real-world environment. The server 104 may store the received signal in the memory 114. The server 104 may determine a virtual location 142 of the avatar 132 associated with the user device 102 in the virtual environment 130 based on the physical location of the user device 102. The server 104 may obtain the environment information 124 and environment information 128 associated with the virtual location and physical location of the user device 102. The server 104 may generate and present an avatar 132 in the virtual environment 130 based on the user profile 134, the obtained environment information 124 and environment information 128.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Operation Mode Control Engine

Operation mode control engine 110 may include, but is not limited to, one or more separate and independent software and/or hardware components of a server 104. The operation mode control engine 110 may be implemented by the processor 108 by executing the information security software instructions 116 to create a virtual environment 130 including a plurality of virtual meeting areas 140a-140d. The operation mode control engine 110 may be implemented by the processor 108 by executing the user interface application 152 to process the request 144 from a user device 102 and generate an avatar 132 associated with the user device 102. The operation mode control engine 110 may be implemented by the processor 108 to verify user authentication based on authentication information 137 of the user profile 134. Verifying user authentication may include granting an authentication to the avatar 132 to access the virtual operation areas 140 to interact with the entity. In some embodiments, verifying user authentication may include granting authentication to the avatar 132 to access one or more applications (e.g., applications 162 or applications 174) in different system environments (e.g., cloud system 160 and on-premise system 170). The operation mode control engine 110 may be implemented by the processor 108 to determine a plurality of compatible protocols based on the user profile 134, interaction objects 136 and an input operation mode received from the user device 102. The operation of the disclosed system 100 is described below.

Receiving Interaction Objects and an Input Operation Mode for an Interaction

The server 104 may receive a plurality of interaction objects 136 from an avatar 132 associated with a user device 102 in a particular virtual operation area 140. For example, the interaction objects 136 may be user data associated with fillable forms, user documents, or questions required by the entity for conducting the interaction. The plurality of the interaction objects 136 for the interaction may include one or more of interaction data, an interaction type, an interaction method, or an interaction status. Each interaction object may represent one of different features associated with the interaction. Each interaction object may be processed by one or more applications in the corresponding system environment.

An interaction type may represent a feature indicating an interaction between the user and an organization entity or a personal interaction between the user and one or more individuals. For example, the interaction between the user and an organization entity may be conducted under a private operation mode. The personal interaction between the user and one or more individuals may be conducted under a public operation mode.

An interaction method may represent a feature of one of different processes, such as making a payment required by an application, sharing information with other individuals, etc. Different system environments may include different applications configured to perform the same or different processes. For example, an interaction method associated with an interaction may be a process implemented by executing a compatible application 162 in a cloud system 160. An interaction method associated with a different interaction may be a process implemented by executing a compatible application 174 by the on-premise server 172 in an on-premise system 170.

An interaction status may represent a feature to indicate whether the interaction is a new interaction or a repeated interaction. The repeated interaction may be conducted previously through the corresponding system and application. The repeated interaction may be determined based on historical interaction data associated with completed interactions stored in a databases 164 or a database 176.

In one embodiment, the use device 102 is configured to allow the user to select an input operation mode for conducting the interaction. In one embodiment, the user interface application 152 may be configured to allow the user to select an input operation mode through a user interface of the use device 102 for conducting the interaction. The input operation mode may be a private operation mode or a public operation mode. Under the private operation mode, user actions associated with the interaction may not be tracked and visible to other public users. The interaction may be operated as an asynchronous and encrypted process. Under the public operation mode, the user actions associated with the interaction may be tracked and viewed by other users or entities. The private operation mode may require higher level of authentication and security requirements to conduct an interaction. The system may verify user authentication to conduct the interaction and maintain an interaction session under both public and private operation modes.

Determine Compatible Protocols and Whether to Switch Between Public and Private Operations for Conducting an Interaction This process may be implemented by the server 104 to determine a set of protocols 180 compatible with a corresponding operation mode based on authentication information of the user and interaction objects 136 received from the user device 102. The server 104 may store a plurality of layers of protocols 180 to implement an interaction. For example, the plurality of layers of protocols 180 may include an application layer, a presentation layer, a session layer, a transport layer, a network layer, a data link layer, and physical layer. The protocols of the application layer may include a set of protocols such as HTTP, HTTP2, HTTP3, etc. The protocols of the presentation layer may include secure sockets layer (SSL), transport layer security (TLS), etc. The session layer may include remote procedure call (RPC), SQL, NetBIOS, etc. The protocols of the transport layer may include a transmission control protocol (TCP). The protocols of the network layer may include internet protocol (IP), internet protocol security (IPsec), etc. The protocols of the data link layer may include NIC (Network Interface Card), Ethernet, etc. The protocols of the physical layer may include Cables, Bluetooth, USB, etc. Each protocol in a particular layer of protocols 180 is configured to provide a corresponding level of communication and security standard to facilitate completing the interaction in a private operation mode or a public operation mode.

In one embodiment, the server 104 may determine a first set of protocols 182 compatible with an input private operation mode to conduct the interaction. If the interaction objects 136 do not match the authentication and security requirements of the first set of the protocols 182 corresponding to the private operation mode, the server 104 may reverse the private operation mode to a public operation mode through the user device 102. In one embodiment, the server 104 may determine a second set of protocols 184 compatible with a public operation mode to conduct the interaction.

Determine a Compatible System Environment with Applications Supporting the Determined Protocols for an Interaction Under an Operation Mode This process may be implemented by the server 104 to determine a system environment with a set of applications which support the determined protocols to conduct the interaction based on various features of the interaction objects 136. Based on the determined operation mode and the corresponding compatible protocols, the operation mode control engine 110 may be implemented by the processor 108 to determine a compatible system environment with a set of applications which support the determined protocols and are configured to process the interaction objects.

For example, if the features of the interaction objects 136 match the authentication requirements of the first set of the protocols under the private operation mode, the server 104 may determine a first system environment with a first set of applications for the interaction. In one embodiment, the features of the interaction objects 136 and the authentication information 137 of the user profile may fulfil the authentication and secure communication requirements of the first set of the protocols 182. The first set of applications are configured to process the interaction objects 136 to implement the interaction. For example, the first system environment may be a cloud system 160 including the first set of applications 162 to support the first set of the protocols 182 for performing private operations. An interaction method and an interaction type of the interaction objects 136 may be processed by one or more applications 162 in the cloud system 160 in a private operation mode.

If the interaction objects 136 do not match the authentication and secure communication requirements of the first set of the protocols, the server 104 may switch to the public operation mode to conduct the interaction in the virtual operation area 140. Under the public operation mode, the server 104 may determine a second system environment with a second set of applications which support the second set of the protocols 184 to conduct the interaction. For example, the interaction objects 136 and the authentication information 137 may fulfil the authentication and secure communication requirements of the second set of the protocols 182. An interaction method and an interaction type of the interaction objects 136 may be supported by one or more applications 174 in the on-premise system 170 in a public operation mode.

Example Operational Flow for Switching Between Public and Private Operations

Figure 3:
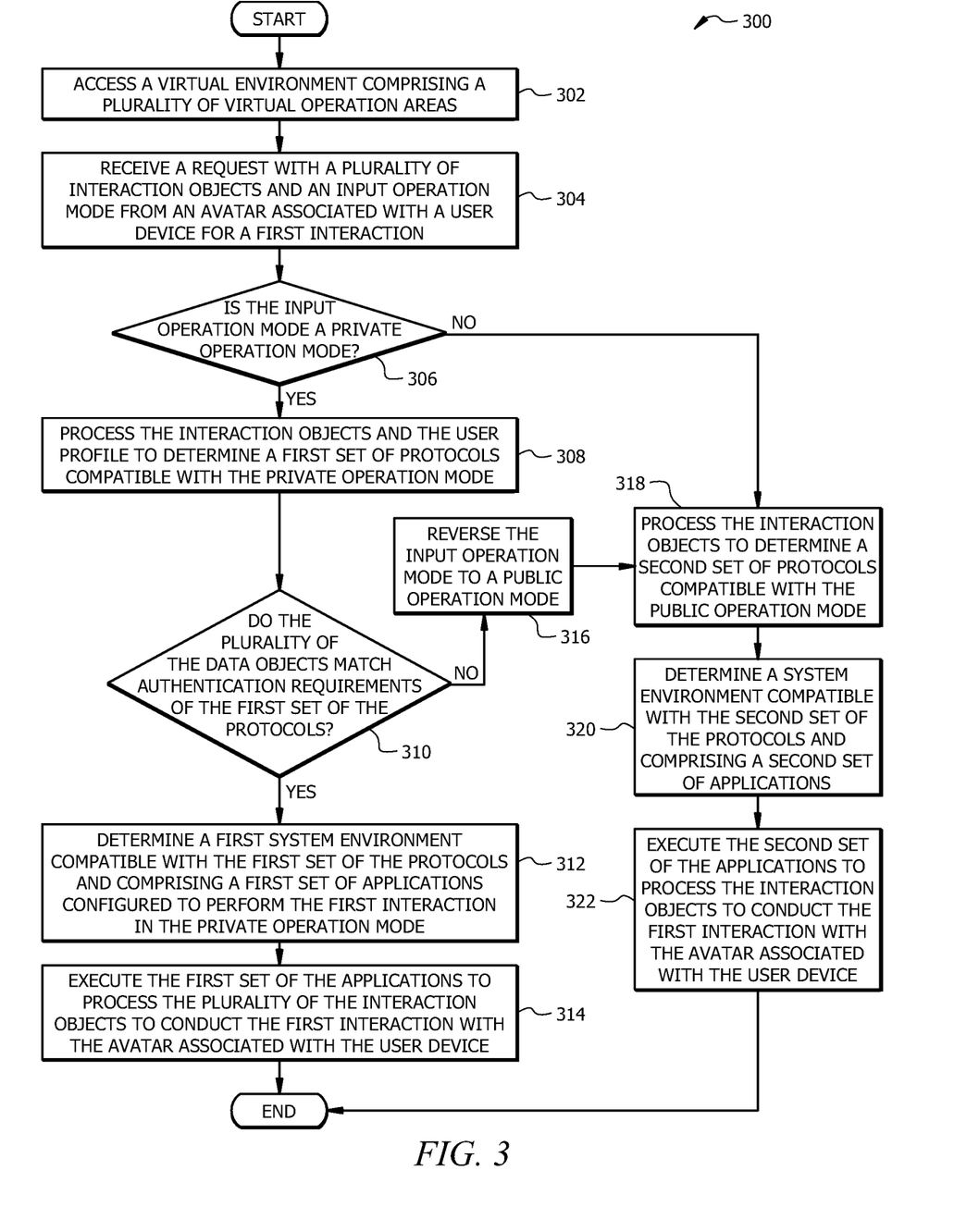
FIG. 3 illustrates an example operational flow of a method for switching between public and private operations in the virtual environment.

FIG. 3 provide an example operational flow of a method 300 of switching between public and private operations to conduct interactions through a compatible computing system in the virtual environment 130. Modifications, additions, or omissions may be made to method 300. Method 300 may include more, fewer, or other operations. For example, operations may be performed by the server 104 in parallel or in any suitable order. One or more operations of method 300 may be implemented, at least in part, in the form of the information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 302-322.

The method 300 begins at operation 302 where the server 104 accesses a virtual environment 130 comprising a plurality of virtual operation areas 140a-140d. Each virtual operation area 140 is configured to provide a corresponding interaction associated with an entity which may operate at one or more physical locations in the real-world environment.

At operation 304, the server 104 receives a request with a plurality of interaction objects 136 and an input operation mode 146 from an avatar 132 associated with a user device 102. The server 104 may access the use profile 134 to obtain authentication information 137 to verify an identity of the user. The authentication information 137 is configured to authorize the avatar 132 associated with a user device 102 to access a particular virtual operation area 140 in a virtual environment 130 and different computing environments. The interaction objects 136 include user data received from the user device 102 for an interaction with the entity through a user interface application 152 executed on the user device 102. The interaction objects for the interaction are indicative of a task to be completed with an entity associated with a computing environment.

At operation 306, the server 104 determines whether the input operation mode 146 is a private operation mode for conducting the interaction. The input operation mode 146 may be selected by the user through the user device 102 associated by the avatar 132 through a user interface application 122 executing on the user device 102.

At operation 308, in response to determining that the input operation mode 146 is the private operation mode, the server 104 processes the plurality of the interaction objects 136 and the user profile 134 to determine a first set of protocols 182 compatible with the private operation mode. The server 104 may select the first set of protocols 182 from the plurality layers of the protocols 180 and assign them for the interaction.

At operation 310, the server 104 verifies whether the plurality of the interaction objects 136 match authentication requirements of the first set of the protocols. In one embodiment, the server 104 verifies whether the features associated with the interaction objects match authentication and security requirements of the first set of the protocols.

At operation 312, in response to determining that the plurality of the interaction objects match the authentication requirements of the first set of the protocols, the server 104 determines a system environment which is compatible with the first set of the protocols. The system environment comprises a first set of applications which support the first set of the protocols in the private operation mode. The first set of applications may be accessed by the avatar 132 with the authentication information 137.

At operation 314, the first set of the applications may be executed by a server or a processor in the corresponding system environment to process the interaction objects 136 to conduct the first interaction between the avatar 132 and the entity in the virtual operation area 140. In one embodiment, the system environment may be a cloud system environment 160 which is configured to provide at least the first set of the applications 162 associated with the entity and operating in the private operation mode.

At operation 316, in response to determining that the interaction objects 136 do not match the authentication requirements of the first set of the protocols corresponding to the private operation mode. In some embodiments, the server 104 may reverse the private operation mode to a public operation mode through the user device 102. The server 104 operates in the public operation mode to conduct the interaction between the avatar 132 and the entity in the virtual operation area 140.

At operation 318, in response to receiving the input operation mode 146 as the public operation mode, the server 104 processes the interaction objects 136 to determine a second set of protocols 184 compatible with a public operation mode. The second set of the protocols 184 are determined by the server 104 from the plurality layers of the protocols for perform public operations.

At operation 320, the server 104 determines a system environment compatible with the second set of the protocols 184. The system environment may include a second set of applications to perform the first interaction between the avatar 132 and the entity in the public operation mode. In some embodiments, the system environment may be an on-premise system environment 170 which is configured to provide at least the second set of the applications 174 associated with the entity.

At operation 322, the second set of the applications may be executed by a corresponding server or a processor to process the interaction objects 136 to conduct the first interaction with the avatar 132 associated with the user device 102 in the virtual operation area 140. In one embodiment, the second set of the applications 174 are executed by the on-premise server 172 in the public operation mode to conduct the interaction between the avatar 132 and the entity in the virtual operation area 140.

In some embodiments, information security software instructions 116 associated with the operational flows of the method 300 and other described processes may be deployed into a practical application executed by the server 104 to complete interactions in response to user interaction requests. The practical application may be implemented by the processor 108 to receive and process a request 144 with interaction objects 136 and an input operation mode from the avatar 132 through the user device 102. The practical application may be implemented by the processor 108 to access the user profile 134 to obtain the authentication information 137 to authorize the avatar 132 to access corresponding a virtual operation area 140 in the virtual environment 130. The authentication information 137 may be used to verify authentication for the avatar 132 to interact with corresponding applications in different system environments. The practical application may be implemented by the processor 108 to determine compatible protocols and a corresponding operation mode based on the input operation mode 146 and the features of the interaction objects 136. Based on the determined operation mode, the practical application may be implemented by the processor 108 to determine a compatible system with a set of applications to process the interaction objects 136 to implement the interaction.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
  a user profile comprising authentication information, wherein the authentication information is configured to authorize a user device associated with a user to access a virtual environment to perform corresponding interactions with an entity associated with different system environments; and
  a plurality of layers of protocols, wherein each layer of protocols comprises a set of protocols, and wherein each protocol is configured to provide a corresponding level of interaction security to facilitate completing the corresponding interactions in a private operation mode or a public operation mode; and a processor operably coupled to the memory, the processor configured to:
  access a virtual environment comprising a plurality of virtual operation areas, wherein each virtual operation area is configured to provide a corresponding interaction associated with the entity;
  receive a request with a plurality of interaction objects and an input operation mode from an avatar associated with a user device for a first interaction in a particular virtual operation area;
  determine whether the input operation mode is a private operation mode;
  in response to determining that the input operation mode is the private operation mode, process the plurality of the interaction objects and the user profile to determine a first set of protocols compatible with the private operation mode, the first set of protocols being from the plurality of layers of the protocols;
  verify whether the plurality of the interaction objects match authentication requirements of the first set of the protocols;
  in response to determining that the plurality of the interaction objects match the authentication requirements of the first set of the protocols, determine a system environment which is compatible with the first set of the protocols and comprises a first set of applications configured to perform the first interaction in the private operation mode; and
  execute the first set of the applications to process the plurality of the interaction objects to conduct the first interaction with the avatar associated with the user device in the virtual operation area.

2. The system of claim 1, wherein the processor is further configured to, in response to determining that the plurality of the interaction objects do not match the authentication requirements of the first set of the protocols corresponding to the private operation mode:
  reverse the private operation mode to a public operation mode through the user device; and
  operate in the public operation mode to conduct the interaction in the virtual operation area.

3. The system of claim 1, wherein the processor is further configured to, in response to determining that the input operation mode is the public operation mode:
  process the plurality of the interaction objects to determine a second set of protocols compatible with a public operation mode, the second set of the protocols being from the plurality layers of the protocols;
  determine a system environment compatible with the second set of the protocols, the system environment comprising a second set of applications to perform the first interaction in the public operation mode; and
  execute the second set of the applications to process the plurality of the interaction objects to conduct the first interaction with the avatar associated with the user device in the virtual operation area.

4. The system of claim 3, wherein the system environment is an on-premise system environment which is configured to provide at least the second set of the applications associated with the entity and process the plurality of the interaction objects in the public operation mode.

5. The system of claim 1, wherein the system environment is a cloud system environment which is configured to provide at least the first set of the applications associated with the entity and process the plurality of the interaction objects in the private operation mode.

6. The system of claim 1, wherein the processor is further configured to process the authentication information of the user profile to authenticate the avatar associated with the user device to access the corresponding system environment.

7. The system of claim 1, wherein the plurality of the interaction objects comprise one or more of interaction data, an interaction type, an interaction method, or an interaction status, and wherein the interaction status indicates whether the interaction is a new interaction or a repeated interaction.

8. A method comprising:
  accessing a virtual environment comprising a plurality of virtual operation areas, wherein each virtual operation area is configured to provide a corresponding interaction associated with the entity;
  receiving a request with a plurality of interaction objects and an input operation mode from an avatar associated with a user device for a first interaction in a particular virtual operation area;
  determining whether the input operation mode is a private operation mode;
  in response to determining that the input operation mode is the private operation mode, processing the plurality of the interaction objects and a user profile to determine a first set of protocols compatible with the private operation mode, the first set of protocols being from a plurality layers of protocols;
  verifying whether the plurality of the interaction objects match authentication requirements of the first set of the protocols;
  in response to determining that the plurality of the interaction objects match the authentication requirements of the first set of the protocols, determining a system environment which is compatible with the first set of the protocols and comprises a first set of applications configured to perform the first interaction in the private operation mode; and
  executing the first set of the applications to process the plurality of the interaction objects to conduct the first interaction with the avatar associated with the user device in the virtual operation area.

9. The method of claim 8, further comprising:
  in response to determining that the plurality of the interaction objects do not match the authentication requirements of the first set of the protocols corresponding to the private operation mode,
    reversing the private operation mode to a public operation mode through the user device; and
    operating in the public operation mode to conduct the interaction in the virtual operation area.

10. The method of claim 8, further comprising:
  in response to determining that the input operation mode is a public operation mode:
  processing the plurality of the interaction objects to determine a second set of protocols compatible with a public operation mode, the second set of the protocols being from the plurality layers of the protocols;
  determining a system environment compatible with the second set of the protocols, the system environment comprising a second set of applications to perform the first interaction in the public operation mode; and
  executing the second set of the applications to process the plurality of the interaction objects to conduct the first interaction with the avatar associated with the user device in the virtual operation area.

11. The method of claim 10, wherein the system environment is an on-premise system environment which is configured to provide at least the second set of the applications associated with the entity and process the plurality of the interaction objects in the public operation mode.

12. The method of claim 8, wherein the system environment is a cloud system environment which is configured to provide at least the first set of the applications associated with the entity and process the plurality of the interaction objects in the private operation mode.

13. The method of claim 8, further comprising processing the authentication information of the user profile to authenticate the avatar associated with the user device to access the corresponding system environment.

14. The method of claim 8, wherein the plurality of the interaction objects comprise one or more of interaction data, an interaction type, an interaction method, or an interaction status, and wherein the interaction status indicates whether the interaction is a new interaction or a repeated interaction.

15. A non-transitory computer-readable medium that stores instructions that when executed by a processor, causes the processor to:
    access a virtual environment comprising a plurality of virtual operation areas, wherein each virtual operation area is configured to provide a corresponding interaction associated with the entity;
    receive a request with a plurality of interaction objects and an input operation mode from an avatar associated with a user device for a first interaction in a particular virtual operation area;
    determine whether the input operation mode is a private operation mode;
    in response to determining that the input operation mode is the private operation mode, process the plurality of the interaction objects and a user profile to determine a first set of protocols compatible with the private operation mode, the first set of protocols being from a plurality layers of protocols;
    verify whether the plurality of the interaction objects match authentication requirements of the first set of the protocols;
    in response to determining that the plurality of the interaction objects match the authentication requirements of the first set of the protocols, determine a system environment which is compatible with the first set of the protocols and comprises a first set of applications configured to perform the first interaction in the private operation mode; and
    execute the first set of the applications to process the plurality of the interaction objects to conduct the first interaction with the avatar associated with the user device in the virtual operation area.

16. The non-transitory computer-readable medium of claim 15, wherein the instructions when executed by the processor further cause the processor to:
    in response to determining that the plurality of the interaction objects do not match the authentication requirements of the first set of the protocols corresponding to the private operation mode,
        reverse the private operation mode to a public operation mode through the user device; and
        operate in the public operation mode to conduct the interaction in the virtual operation area.

17. The non-transitory computer-readable medium of claim 15, wherein the instructions when executed by the processor further cause the processor to:
    in response to determining that the input operation mode is a public operation mode:
        process the plurality of the interaction objects to determine a second set of protocols compatible with a public operation mode, the second set of the protocols being from the plurality layers of the protocols;
        determine a system environment compatible with the second set of the protocols, the system environment comprising a second set of applications to perform the first interaction in the public operation mode; and
        execute the second set of the applications to process the plurality of the interaction objects to conduct the first interaction with the avatar associated with the user device in the virtual operation area.

18. The non-transitory computer-readable medium of claim 17, wherein the system environment is an on-premise system environment which is configured to provide at least the second set of the applications associated with the entity and process the plurality of the interaction objects in the public operation mode.

19. The non-transitory computer-readable medium of claim 15, wherein the system environment is a cloud system environment which is configured to provide at least the first set of the applications associated with the entity and process the plurality of the interaction objects in the private operation mode.

20. The non-transitory computer-readable medium of claim 15, wherein the instructions when executed by the processor further cause the processor to
    authenticate the avatar associated with the user device to access the corresponding system environment,
    wherein the plurality of the interaction objects comprise one or more of interaction data, an interaction type, an interaction method, or an interaction status, and wherein the interaction status indicates whether the interaction is a new interaction or a repeated interaction.

* * * * *